US005995783A

United States Patent [19]
Garcia et al.

[11] Patent Number: 5,995,783
[45] Date of Patent: Nov. 30, 1999

[54] RECEPTACLE FOR PARTICULATE MATTER

[75] Inventors: Christopher S. Garcia; Ronald R. Holland; Scott H. Schwallie, all of Rochester, N.Y.

[73] Assignee: Eastman Kodak Company, Rochester, N.Y.

[21] Appl. No.: 09/052,620

[22] Filed: Mar. 31, 1998

[51] Int. Cl.⁶ ................................................. G03G 15/08
[52] U.S. Cl. ........................... 399/120; 215/42; 220/634; 220/643; 399/262
[58] Field of Search ...................... D18/43, 40; 399/102, 399/103, 106, 120, 258, 260, 262; 215/372, 376, 42; 220/605, 628–630, 634, 640, 643; 222/DIG. 1, 561, 562; 277/630, 634

[56] References Cited

U.S. PATENT DOCUMENTS

| D. 408,445 | 4/1999 | Schwallie et al. ........................ D18/43 |
| D. 408,846 | 4/1999 | Schwallie et al. ........................ D18/43 |
| 3,804,139 | 4/1974 | Kimm ................................... 215/31 X |
| 4,062,385 | 12/1977 | Katusha et al. . | |
| 4,341,317 | 7/1982 | Suzuki et al. .............................. 215/31 |
| 4,641,758 | 2/1987 | Sugiura .................................... 215/1 C |
| 4,895,104 | 1/1990 | Yoshino et al. .......................... 399/106 |
| 5,040,024 | 8/1991 | Fukuda et al. . | |
| 5,165,557 | 11/1992 | Ota et al. . | |
| 5,226,550 | 7/1993 | Mikolaitis et al. . | |
| 5,349,427 | 9/1994 | Benedict et al. ......................... 399/360 |
| 5,383,565 | 1/1995 | Luch ..................................... 215/31 X |
| 5,392,102 | 2/1995 | Toyoizumi et al. ...................... 399/228 |
| 5,425,404 | 6/1995 | Dyer . | |
| 5,435,451 | 7/1995 | Dyer . | |
| 5,579,937 | 12/1996 | Valyi . | |
| 5,598,941 | 2/1997 | Semersky et al. . | |
| 5,655,179 | 8/1997 | Ueda et al. .......................... 141/364 X |
| 5,737,675 | 4/1998 | Okada et al. ........................... 399/258 |

*Primary Examiner*—Matthew S. Smith
*Attorney, Agent, or Firm*—Lawrence P. Kessler

[57] ABSTRACT

A receptacle for particulate matter to be supplied to an apparatus. The receptacle includes a container, adapted to store particulate matter. The container has an opening defined therein. A substantially rigid, relatively nondeformable flange has a portion permanently connected to the container within the defined opening so as to facilitate placement and removal of the receptacle with the apparatus.

9 Claims, 6 Drawing Sheets

RECEPTACLE FOR PARTICULATE MATTER

CROSS REFERENCE TO RELATED APPLICATIONS

U.S. patent appl. Ser. No. 09/052,475, filed Mar. 31, 1998, entitled "SLIDE COVER BREATHABLE SEAL FOR A MARKING PARTICLE RECEPTACLE" in the name of Christopher S. Garcia et al.

U.S. patent appl. Ser. No. 09/052,717, filed Mar. 31, 1998, entitled "IDENTIFYING FEATURES ASSOCIATED WITH THE SLIDE COVER FOR A MARKING PARTICLE RECEPTACLE" in the name of Christopher S. Garcia et al.

U.S. patent appl. Ser. No. 09/052,686, filed mar. 31, 1998 entitled "SLIDE COVER FOR MARKING PARTICLE RECEPTACLE" in the name of Christopher S. Garcia et al.

FIELD OF THE INVENTION

This invention relates in general to receptacles for particulate matter, and more particularly to a receptacle for marking particles for use in developing electrostatic latent images in reproduction apparatus.

BACKGROUND OF THE INVENTION

Typical commercial reproduction apparatus include electrostatographic process copier/duplicators or printers, for example. With such reproduction apparatus, pigmented marking particles are utilized to develop an electrostatic latent image of information to be reproduced on a dielectric support member for transfer to a receiver member, or directly onto a receiver member. The receiver member bearing the transferred marking particle developed image is transported through a fuser device where the marking particle image is fixed (fused) to the receiver member, for example, by heat and pressure to form a permanent reproduction.

The marking particles for developing the electrostatic latent image are supplied to the reproduction apparatus development station in a receptacle removably connected to a replenisher supply sump for the development station. U.S. Pat. No. 4,062,385 (issued Dec. 13, 1977, in the names of Katusha et al), shows a marking particle receptacle having a particle-containing portion with a base. The base has an opening facing downward in use with the replenisher supply sump, and a flange extending outward from the opening. A cover is slidably secured to the flange. A receiving apparatus with the development station for the receptacle includes a sump for receiving marking particles through the base of the receptacle when the opening of the receptacle is positioned directly above the sump. The receptacle, with the cover in place over the opening, is positioned beside the sump. The receptacle portion is slid off the cover and over the sump with the flange sliding on a receiving surface that surrounds a sump opening. A web seal, generally of plastic or paper, attached to the underside of the flange around the opening, is folded once and then extends between the cover and flange to a position outside the receptacle where it may be grasped by an operator and removed to release the marking particles into the sump. The web seal is discarded, but the containing portion is moved back over the cover after the receptacle is emptied to prevent the escape of residual marking particles in the marking particle receptacle during removal and further handling in recycling of the receptacle.

In the above structure, the receptacle is locked to the sump by sliding the flange surrounding the base opening of the receptacle into slots in the receiving apparatus. In high speed/high volume reproduction apparatus, it is desirable to provide as large a supply of marking particles as possible to limit the necessity to shut the reproduction apparatus down for resupply of the marking particles. However, it has been found that the size of the receptacle, and thus the amount of marking particles stored for use in the reproduction apparatus, has been limited by the above described structure. That is, the strength of the flange formed with the receptacle base has to be adequate to enable the necessary sliding movement of the receptacle into the supply location of the receiving apparatus. As the size of the formed receptacle increases, the flange tends to become relatively weaker to the point that it can no longer enable the receptacle to reliably slide into the supply location of the receiving apparatus, and may not maintain a proper seal with an associated cover. Therefore, the receptacles have been kept to a reasonable limited size, and thus have to be replaced more often than would otherwise be desired. This decreases reproduction apparatus throughput and efficiency. U.S. Pat. No. 5,040,024 (issued Aug. 13, 1991, in the names of Fukuda et al) shows a separate flange for a marking particle container. However, there is no indication that the container or the flange could be constructed in a manner to optimize the respective functions thereof.

SUMMARY OF THE INVENTION

In view of the above, this invention is directed to a receptacle of particular construction which enables a larger quantity of particulate matter to be supplied to an apparatus such as for example the development station of a reproduction apparatus. The receptacle includes a container, adapted to store particulate matter. The container has an opening defined therein. A substantially rigid, relatively non-deformable flange has a portion permanently connected to the container within the defined opening so as to facilitate placement and removal of the receptacle with the apparatus.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
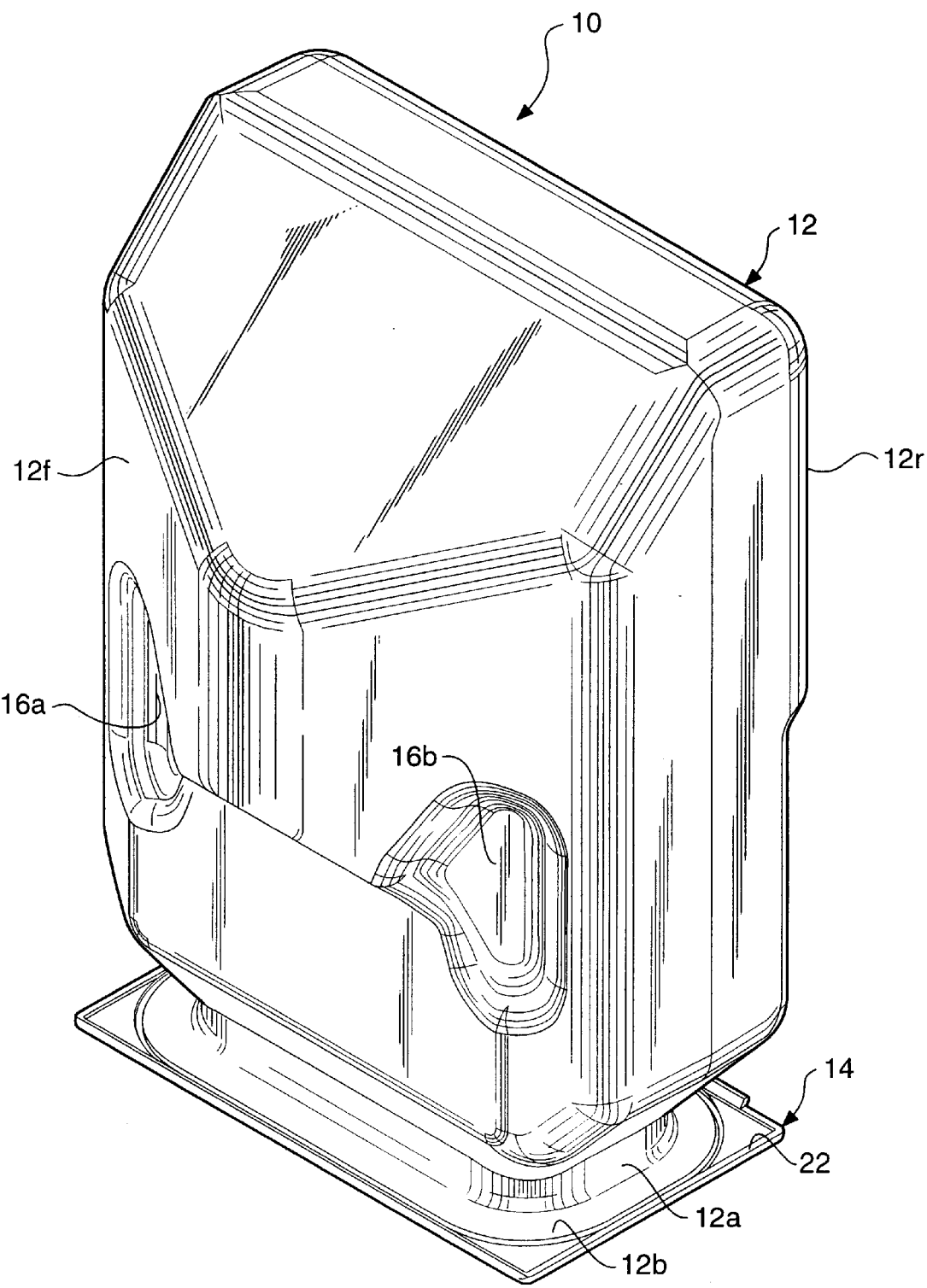
FIG. 1 is a front view, in perspective, of the particulate matter receptacle, according to this invention.
Figure 2:
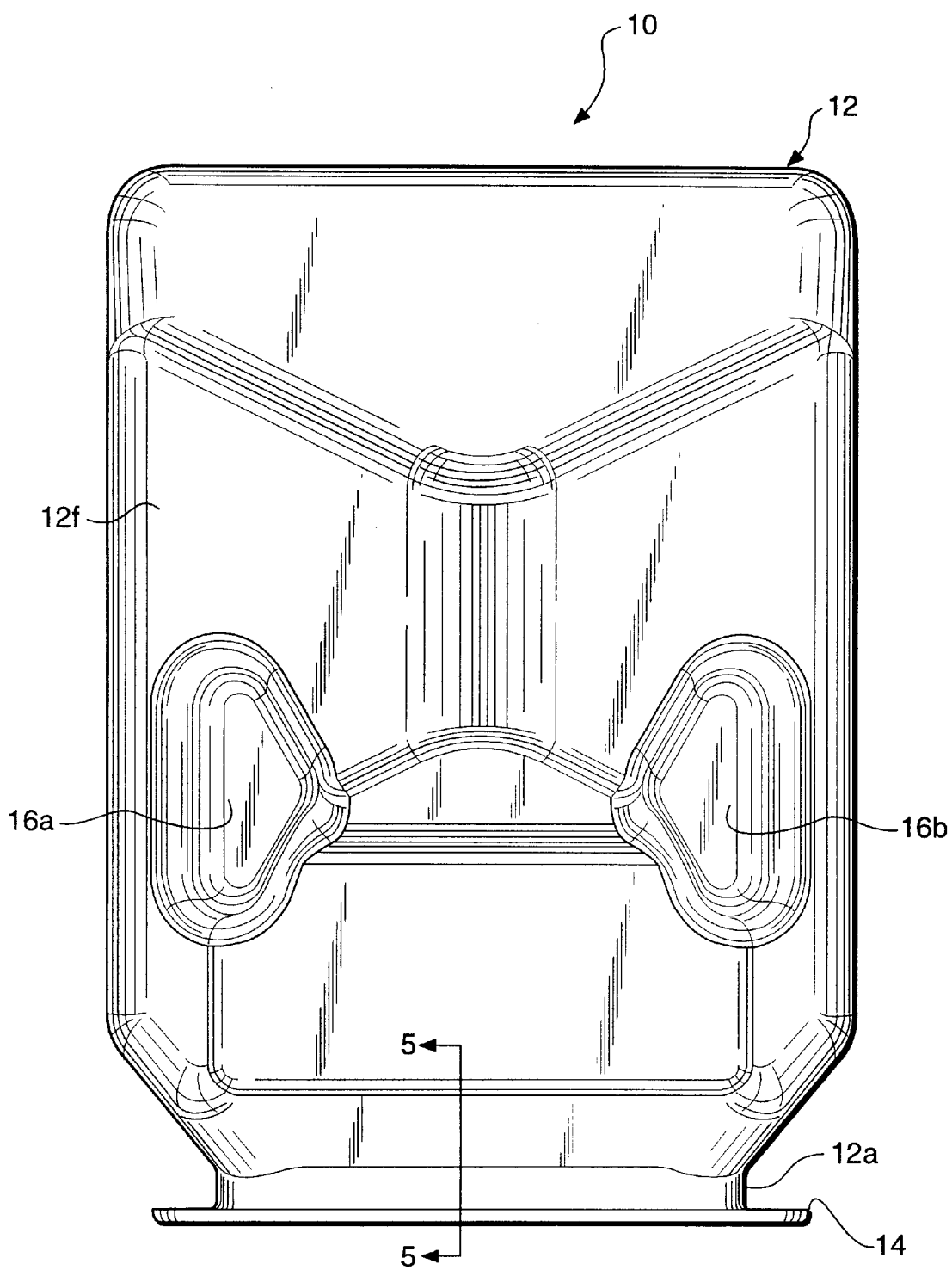
FIG. 2 is a front elevational view of the particulate matter receptacle shown in FIG. 1.
Figure 3:
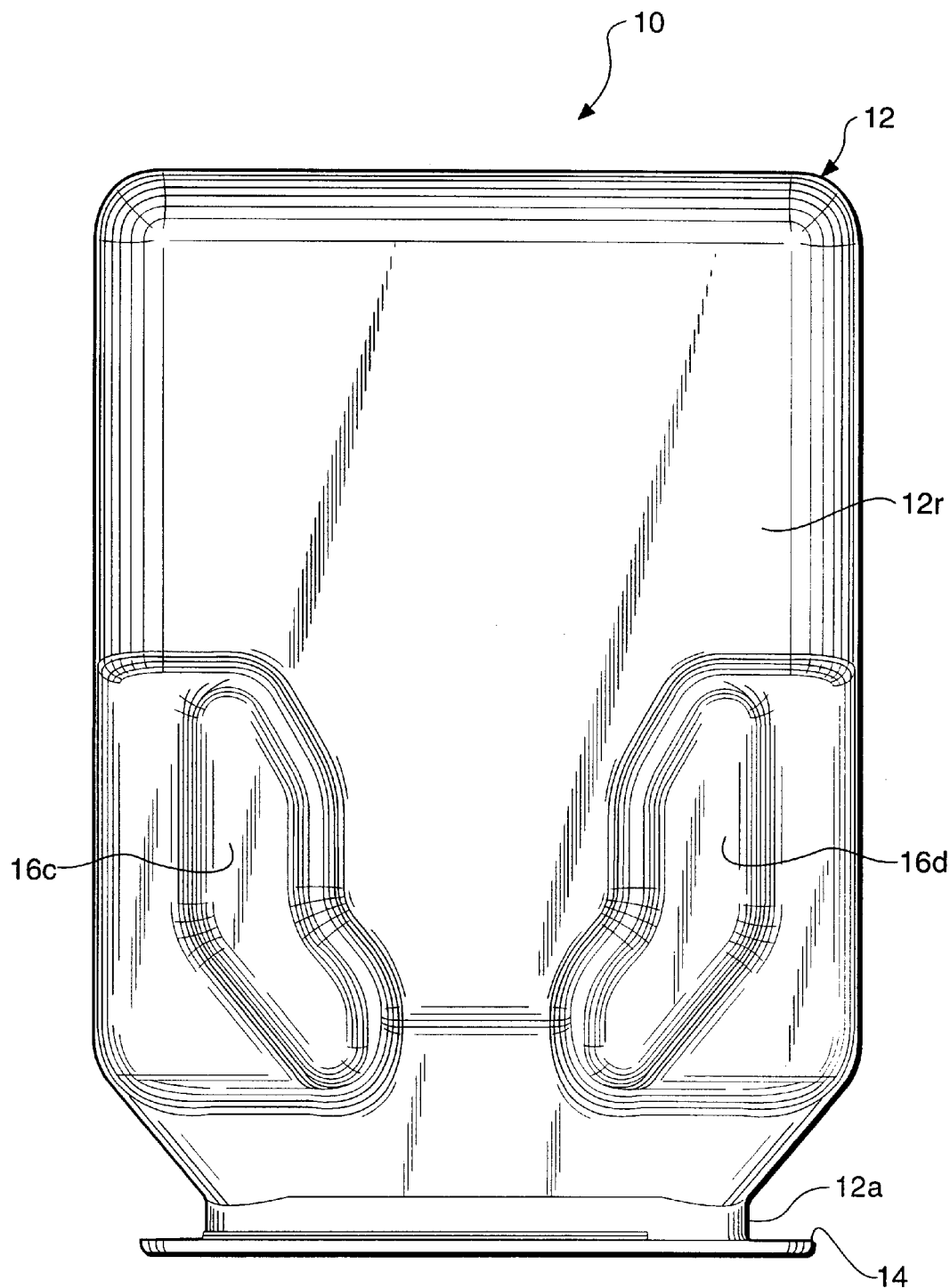
FIG. 3 is a rear elevational view of the particulate matter receptacle shown in FIG. 1.
Figure 4:
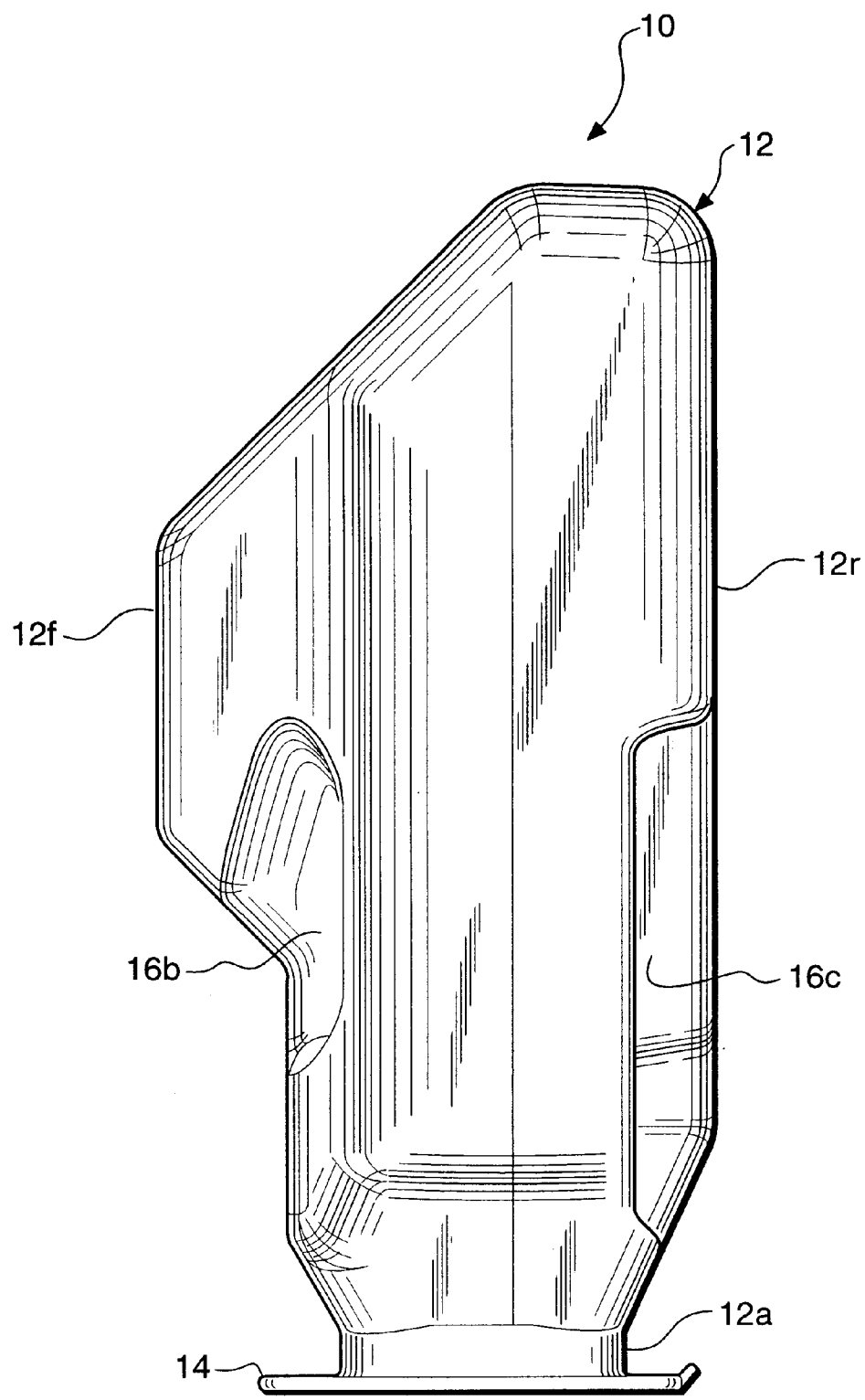
FIG. 4 is a side elevational view of the particulate matter receptacle shown in FIG. 1.

Referring now to the accompanying drawings, the particulate matter receptacle, according to this invention, generally designated by the numeral 10, is best shown in FIGS. 1–4. The receptacle 10, per se, is of a substantially two-piece construction including a container 12 and a support flange 14. The container 12 is, for example, a blow molded plastic housing formed of polyethylene, polypropylene, a copolymer of these resins, polyethylene terephthalate, or polyvinyl chloride. The particular shape of the housing of the container 12 is selected to provide a maximum particulate matter storage capacity with a minimum resistance to particulate matter flow as the matter fills or empties from the container. The receptacle 10 may be adapted to cooperate with a slide cover and wiper-seal (not shown).

In the particular embodiment shown herein, the particulate matter is pigmented marking particles adapted to be used as image development material in reproduction apparatus, such as copier/duplicators or printers for example. It is of course understood that the particulate matter can be used in other apparatus for any of a variety of other purposes.

As noted above, the container 12 of the receptacle 10 is blow molded. Blow molding is a well known, cost effective process for forming containers. However, the process has certain limitations as to the shape and dimensions of the container opening. That is, large mouth containers usually require the use of a blow dome, which must be removed after the basic formation of the container is completed. As the size of the container increases, the integrity of the flange becomes much more critical. At least a portion of the flange for the container is formed in the blow dome area. As a result the flange will be generally thinner than the nominal wall thickness of the container. A relatively thin flange is weak and easily deformed. This will make loading and unloading of the receptacle in the apparatus with which it is to be associated difficult. Moreover, if the receptacle includes any well known slide cover, the thin flange can cut into the cover seal causing unacceptable damage and possible leakage of the particulate matter.

In order to achieve necessary strength and a leak tight seal, the flange 14 of the receptacle 10 must be of a uniform wall thickness sufficient to withstand load without deflection so as to remain in a substantially flat condition. According to this invention, it has been determined that the flange 14 be formed as a separate piece from the container 12. Although the flange 14 may be formed by various methods, such as casting or machining from a solid piece of material for example, the preferred method for forming the flange is by injection molding. The injection molded flange 14 allows for more built-in structural integrity with improved flatness control. Further, such injection molded flange can be provided with various features (for example, tabs or protrusions) which would, for example, facilitate placement and removal of the receptacle 10 with the reproduction apparatus and prevent damage to cover seals.

Figure 6:
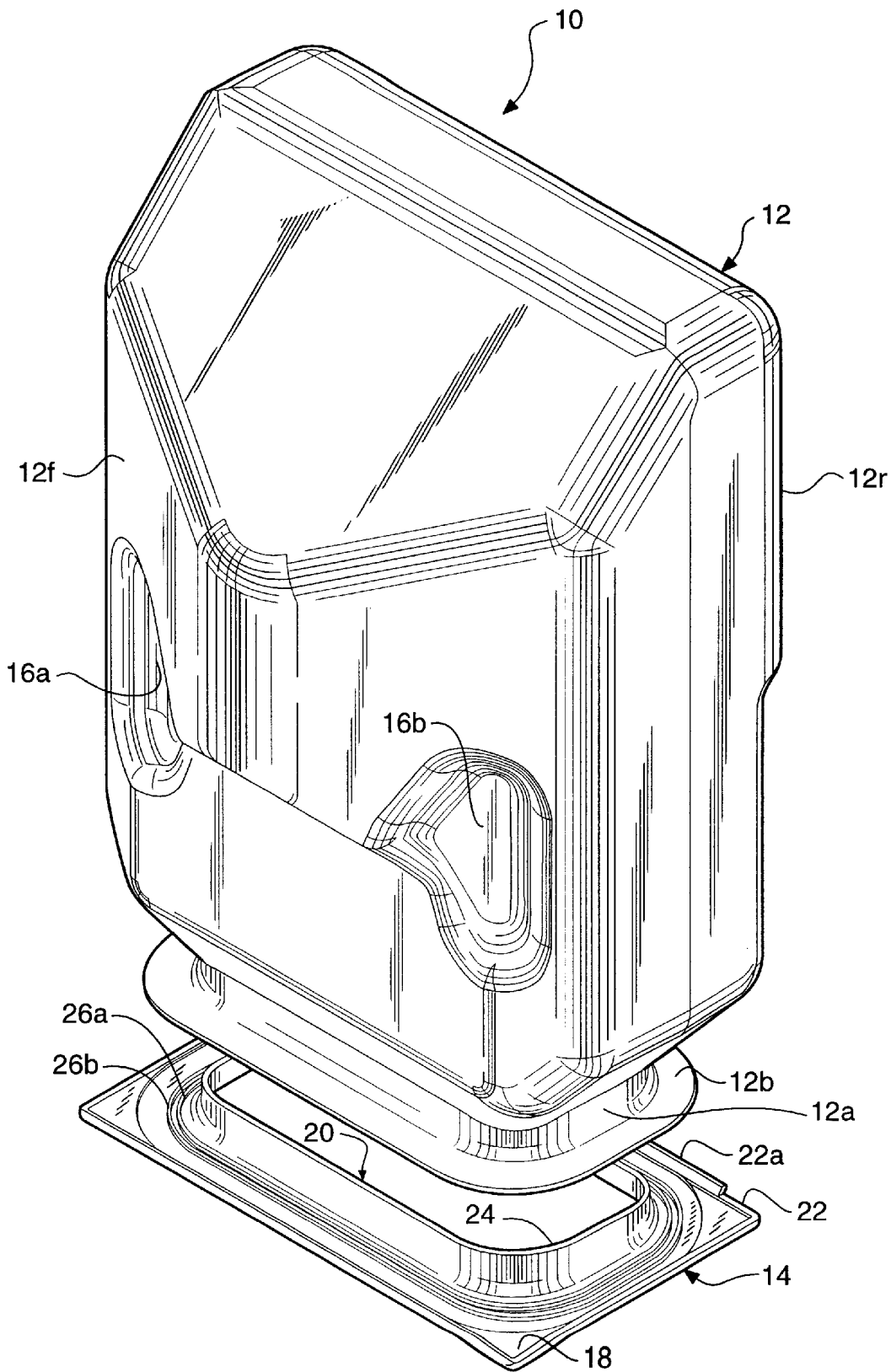
FIG. 6 is an exploded view, in perspective of a portion of the container and the flange member of the particulate matter receptacle shown in FIG. 1.

As best shown in FIG. 6, the injection molded flange 14 has a planar member 18 defining an appropriately dimensioned opening 20. The dimensions of the opening 20 is selected to be approximately equal to the dimensions of the opening of the container 12. The planar member 18 has an external rim 22 formed about the periphery of such member. The external rim 22 serves to add strength to the planar member 18 and provides non-deformable slides which may cooperate with guides (not shown) in a reproduction apparatus to facilitate placement and removal of the receptacle 10 with the apparatus. A portion 22a of the rim 22 may be formed as a raised feature which serves as a locator for the planar member 18, and thus the receptacle 10, when placed in operative association for example with the replenisher supply sump of the development station of the reproduction apparatus.

Figure 5:
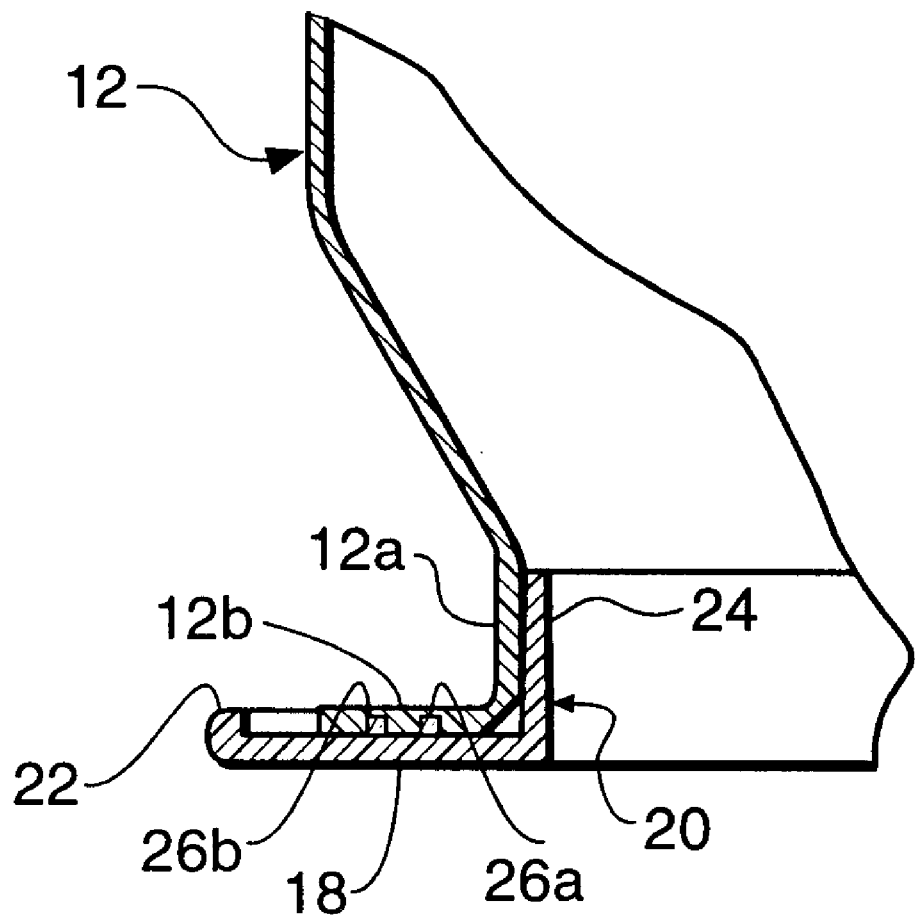
FIG. 5 is a front elevational view, in cross-section, of a portion of the particulate matter receptacle, taken along lines 5—5 of FIG. 2, showing the union of the container and the flange of the receptacle.

A collar 24 extends from the planar member 18, substantially perpendicular thereto, about the defined opening 20. At least one seal bead (two beads 26a, 26b shown) is formed on the planar member between the collar 24 and the rim 22. In order to assemble the container 12 and the flange 14 to form the desired receptacle 10, the collar 24 of the flange is inserted within the neck 12a of the container until the planar member 18 engages the flange portion 12b of the blow dome area of the container. As will be readily appreciated, the dimensions of the collar 24 and the corresponding dimensions of the opening of the container 12 provide a relatively snug slip fit therebetween. With the flange 14 properly inserted in the neck 12b of the container to relatively locate the flange with the container, the two may then be joined into a unitary structure. For example, utilizing any well known heat sealing process, the seal beads 26a, 26b may be heated to a temperature sufficient to weld the planar member 18 to the container 12 in a manner which will prevent leakage of particulate matter therebetween (see FIG. 5).

The resultant receptacle 10, due primarily to the substantial strength of the configuration of the flange 14, will thereafter exhibit substantial strength and rigidity. As such, deformation of the flange will be substantially prevented and the cover seals will be protected from damage so that the receptacle can be readily placed in and removed from the apparatus with which the receptacle is associated. Further, the relative rigidity of the flange assures a proper seal for the receptacle with a slide cover or wiper seal.

As will also be appreciated from the drawings (particularly FIGS. 1–4), the container 12 of the receptacle 10 as blow molded has several built-in features 16a–16d. The built-in features 16a–16d provide for improved handling of the receptacle and facilitate its placement and removal in a reproduction apparatus or other equipment with which the receptacle is adapted to be associated. The features 16a–16d of the container 12 are particularly shaped recesses formed in opposed generally upstanding front (12f) and rear (12r) walls of the container. The recesses are adapted to be readily gripped by human hands. The orientation and configuration of the recesses are selected to cause the hands to be optimally positioned for comfortably handling the receptacle 10, and sliding the receptacle into and out of the reproduction apparatus. That is, the recesses 16a–16d are shaped to readily accommodate the thumbs and fingers of an operator, respectively, in opposed relationship to provide for a secure grip on the receptacle. Further, the recesses are located approximately about the center of gravity of a filled receptacle so that lifting and maneuvering of the receptacle, from a flange on top position (for filling and storage) to a flange on the bottom position (for loading/unloading), is readily accomplished.

The invention has been described in detail with particular reference to certain preferred embodiment thereof, but it will be understood that variations and modifications can be effected within the spirit and scope of the invention.

PARTS LIST

10—particulate matter receptacle
12—container
12a—container neck
12b—flange portion of blow dome
12f—front wall
12r—rear wall
14—support flange
16a–16d—built-in features
18—planar member 20—opening
22—rim
24—collar
26a–26b—seal beads

What is claimed is:

1. A receptacle of particular construction which enables a relatively large quantity of marking particles to be supplied to the development station of a reproduction apparatus, said receptacle comprising:

a container, adapted to store marking particles, said container having a wide mouth opening defined therein to facilitate passage of marking particles to said developer station; and a substantially rigid, relatively non-deformable flange external to said defined wide mouth opening, having a portion connected to said container within said defined opening, wherein opposed edges of said flange serve as slides for said receptacle as it is placed in or removed from the reproduction apparatus.

2. The receptacle according to claim 1 wherein said marking particle storing container includes a plurality of opposed recesses providing for improved handling of the receptacle by facilitating two-handed placement and removal in the reproduction apparatus with which the receptacle is adapted to be associated.

3. The receptacle according to claim 2 wherein said container includes front and rear walls, and said opposed recesses are respectively located in opposed relation in said front and rear walls.

4. The receptacle according to claim 1 wherein said container includes a neck portion defining said opening, and said flange includes an upstanding collar received within said neck portion.

5. The receptacle according to claim 4 wherein the dimensions of said neck portion and said flange are selected to provide a snug slip fit therebetween prior to welding said flange to said neck portion by at least one seal bead.

6. The receptacle according to claim 1 wherein said flange includes a strengthening rim about the periphery thereof.

7. The receptacle according to claim 6 wherein said flange includes a feature on said rim, said feature serving to locate said flange with respect to the reproduction apparatus.

8. A method for forming a receptacle for particulate matter, to be supplied to an apparatus, comprising the steps of:

blow molding a container, adapted to store particulate matter, said container having a wide mouth opening defined therein to facilitate passage of particles to said apparatus;

forming a substantially rigid, relatively non-deformable flange, said flange defining an opening with an upstanding collar surrounding such opening; and heat sealing said substantially rigid, relatively non-deformable flange to said container so that said flange collar is located external to said defined wide mouth opening of said container and within said defined opening of said container.

9. The method for forming a receptacle for particulate matter of claim 8 wherein the step of forming the substantially rigid, relatively nondeformable flange includes injection molding of such flange.

* * * * *